M. McNITT.
Cultivator.

No. 167,458. Patented Sept. 7, 1875.

WITNESSES:
E. Nevoux
A. F. Terry

INVENTOR:
Martin McNitt
BY
Munn & Co.
ATTORNEYS.

UNITED STATES PATENT OFFICE.

MARTIN McNITT, OF MOUND STATION, ILLINOIS.

IMPROVEMENT IN CULTIVATORS.

Specification forming part of Letters Patent No. 167,458, dated September 7, 1875; application filed July 10, 1875.

*To all whom it may concern:*

Figure 1:
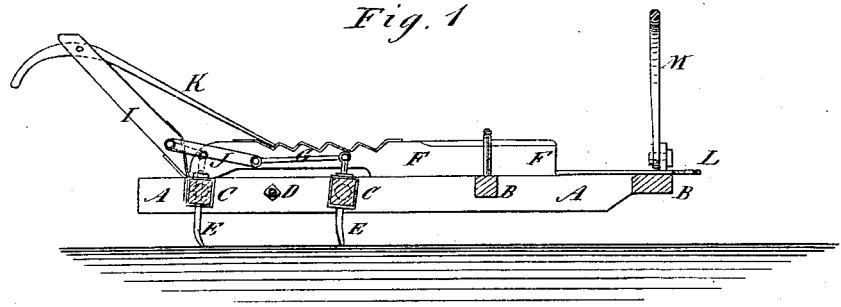
Figure 2:
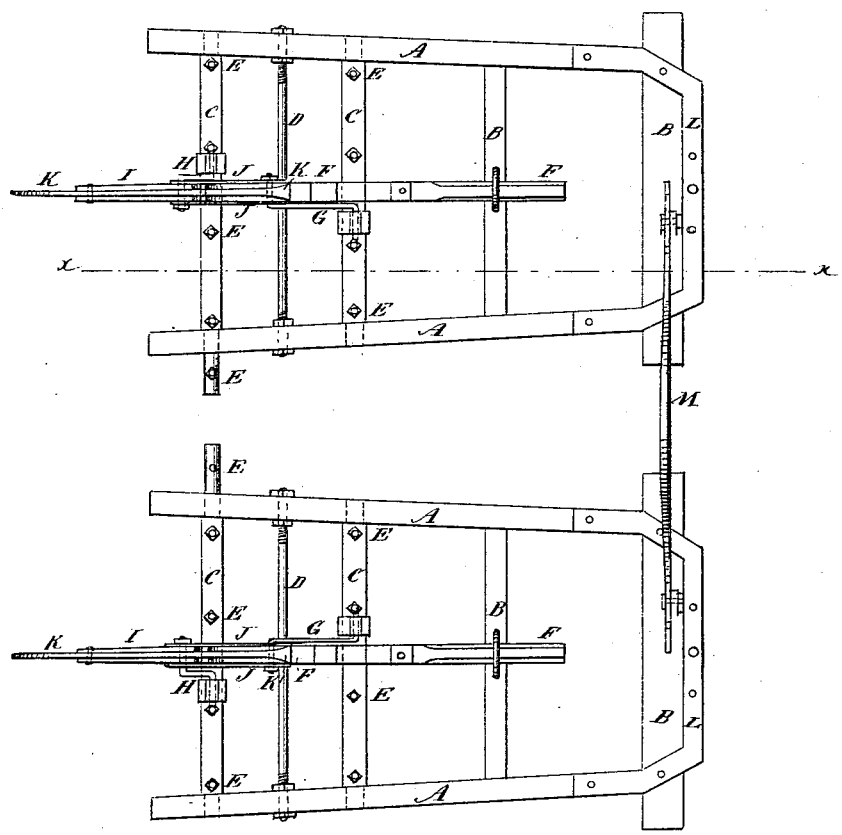

Be it known that I, MARTIN McNITT, of Mound Station, in the county of Brown and State of Illinois, have invented a new and useful Improvement in Cultivator, of which the following is a specification:

Figure 1 is a vertical longitudinal section of my improved cultivator, taken through the line $x\ x$, Fig. 2. Fig. 2 is a top view of the same.

Similar letters of reference indicate corresponding parts.

The invention is an improvement in the class of cultivators or harrows whose teeth are attached to pivoted or rock bars, whereby their pitch may be adjusted at will. The improvement relates to the arrangement of the pivoted handles of the implement to act as pawls in conjunction with the ratchet-bars, by which the rock-bars are adjusted and held in any position, as hereinafter described.

The harrow-frame is made in two parts, each part consisting of two side bars, A, connected by two cross-bars, B, two rock-bars, C, and a long bolt, D. The cross-bars B are rigidly attached to the forward parts of the side bars A. The rock-bars C are pivoted to the rear part of the side bars A, which side bars are kept from springing away from said rock-bars by a long bolt, D, placed midway between the rock-bars. To the rock-bars C are attached the teeth E, to which any desired pitch may be given by adjusting the said rock-bars. F is a bar placed upon the upper sides of the rock-bars C and the rear cross-bar B, and the forward part of which slides in a keeper attached to said rear cross-bar B. To the middle part of the bar F is pivoted the upper arm of a double crank, G, the lower arm of which is pivoted to the forward rock-bar C. To the rear roller C is pivoted the lower arm of a double crank, H, the upper arm of which is pivoted to the upwardly-projecting bar I, the lower end of which is pivoted to the rear rock-bar C, and which is connected with the sliding bar F by two pivoted straps, J. Upon the upper side of the rear part of the sliding bar F are formed ratchet-teeth to receive the engaging end of the pawl K, which is pivoted to the upper end of the bar I, and its rear end is bent like a plow-handle for convenience in grasping and operating it. By this construction, by grasping the handles of the pawls K the said pawls may be raised from the rock-bars F, and the rock-bars C turned to give the teeth E any desired pitch, and to raise the said teeth away from the ground for convenience in turning and in passing from place to place. To the forward ends of the side bars A, and to the end parts of the front cross-bars B, are secured the end parts of the draw-bars L, the middle parts of which are parallel with, and a little in front of, the middle parts of the said front cross-bars B, and have several holes formed in them to receive the draft, so that the point of draft attachment may be adjusted, as required.

M is an arched bar or bow, the ends of which are swiveled to the front cross-bars B, so as to connect the forward ends of the two parts of the harrow-frame, and at the same time allow freedom of motion to said parts, and also to pass over tall plants without injuring them.

The ends of the rear rock-bars C project upon the adjacent sides of the inner side bars A, and have teeth E attached to said projecting ends to work close to the rows of plants being cultivated.

Having thus described my invention, I claim as new and desire to secure by Letters Patent—

The combination, with the ratchet-bars F and the rock-bars C, carrying teeth E, of the combined handles and pawl K, pivoted in supports I, and arranged to operate in the manner shown and described.

MARTIN McNITT.

Witnesses:
H. A. MARMY,
J. W. MOORE.